United States Patent
Oishi et al.

(10) Patent No.: US 7,788,643 B2
(45) Date of Patent: Aug. 31, 2010

(54) METHOD AND APPARATUS FOR SUPPORTING VERIFICATION OF HARDWARE AND SOFTWARE, AND COMPUTER PRODUCT

(75) Inventors: Ryosuke Oishi, Kawasaki (JP); Qiang Zhu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1179 days.

(21) Appl. No.: 11/213,942

(22) Filed: Aug. 30, 2005

(65) Prior Publication Data

US 2006/0206760 A1    Sep. 14, 2006

(30) Foreign Application Priority Data

Mar. 14, 2005    (JP) .............................. 2005-072099

(51) Int. Cl.
G06F 9/44    (2006.01)
(52) U.S. Cl. ...................... 717/126; 717/104
(58) Field of Classification Search ............... 717/104, 717/124, 126
See application file for complete search history.

(56) References Cited

U.S. PATENT DOCUMENTS

| | | | |
|---|---|---|---|
| 2004/0088677 A1 * | 5/2004 | Williams | 717/104 |
| 2004/0093600 A1 | 5/2004 | Takemura | |
| 2005/0144529 A1 * | 6/2005 | Gotz et al. | 714/38 |
| 2006/0195747 A1 * | 8/2006 | Pramanick et al. | 714/742 |

FOREIGN PATENT DOCUMENTS

| | | |
|---|---|---|
| JP | 2002-297412 | 10/2002 |
| JP | 2002-297412 A * | 10/2002 |
| JP | 2004-157805 | 6/2004 |

OTHER PUBLICATIONS

Office Action issued in corresponding Japanese Patent Application No. 2005-072099; mailed on Mar. 18, 2008.

* cited by examiner

*Primary Examiner*—James Rutten
(74) *Attorney, Agent, or Firm*—Staas & Halsey LLP

(57) ABSTRACT

An apparatus for supporting a verification for each of a plurality of functions of a target object, includes: a receiving unit that receives a use case diagram that includes a plurality of use cases each of which corresponding to each of the functions; an extracting unit that extracts a relation between the use cases from the use case diagram; and a setting unit that sets a priority of verification for each of the use cases based on the relation.

12 Claims, 14 Drawing Sheets

| VERIFICATION ITEM | PRIORITY |
|---|---|
| VERIFY "DRAW TRIANGLE" | P1 |
| VERIFY "DRAW STRAIGHT LINE" | P2 |
| VERIFY "SET DRAWING COLOR" | P3 |
| VERIFY "CLEAR SCREEN" | P4 |

| VERIFICATION ITEM | PRIORITY |
|---|---|
| VERIFY "DRAW STRAIGHT LINE" | P |
| VERIFY "DRAW DOT" | $P + \alpha$ |

600

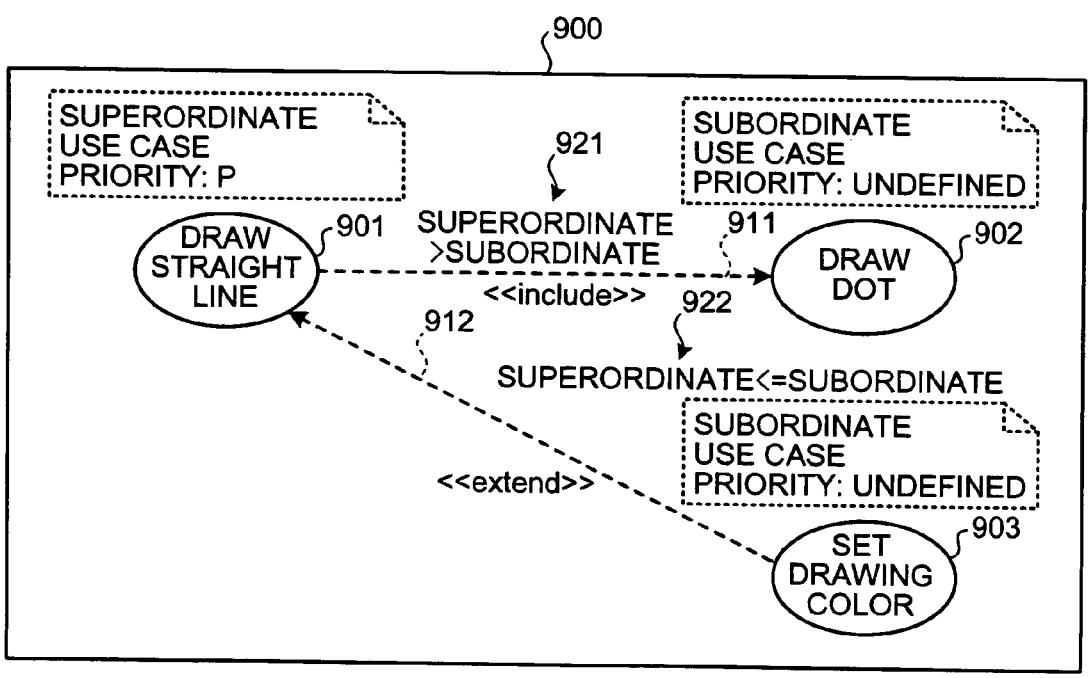

| VERIFICATION ITEM | PRIORITY |
|---|---|
| VERIFY "DRAW STRAIGHT LINE" | P |
| VERIFY "DRAW DOT" | P - 3 |
| VERIFY "SET DRAWING COLOR" | P + 1 |

| VERIFICATION ITEM | PRIORITY |
|---|---|
| VERIFY "DRAW STRAIGHT LINE" | P |
| VERIFY "DRAW DOT" | P + α |
| VERIFY "SET DRAWING COLOR" | P + α + β |

1400

| VERIFICATION ITEM | PRIORITY |
|---|---|
| VERIFY "DRAW STRAIGHT LINE" | P |
| VERIFY "CLEAR SCREEN" | P |
| VERIFY "DRAW DOT" | $P + \alpha$ |
| VERIFY "SET DRAWING COLOR" | $P + \alpha + \beta$ |

| VERIFICATION ITEM | PRIORITY |
|---|---|
| VERIFY "DRAW RECTANGLE" | P |
| VERIFY "ERASE SCREEN" | P |

| VERIFICATION ITEM | PRIORITY |
|---|---|
| VERIFY "DRAW POLYGON" | P |
| VERIFY "DRAW TRIANGLE" | P + β |
| VERIFY "SET DRAWING COLOR" | P + α + β |

1800

| VERIFICATION ITEM | PRIORITY |
|---|---|
| VERIFY "DRAW DOT" | $\lambda$ |

2000

2200

| VERIFICATION ITEM | PRIORITY |
|---|---|
| VERIFY FUNCTION 1 | P |
| VERIFY FUNCTION 2 | P |
| VERIFY FUNCTION 3 | P + 2 |
| VERIFY FUNCTION 4 | P + 1 |
| VERIFY FUNCTION 5 | P + 3 |

2400

| VERIFICATION ITEM | PRIORITY |
|---|---|
| VERIFY "DRAW RECTANGLE" | P |
| VERIFY "DRAW STRAIGHT LINE" | P |
| VERIFY "DRAW DOT" | P |
| VERIFY "SET DRAWING COLOR" | P |

US 7,788,643 B2

METHOD AND APPARATUS FOR SUPPORTING VERIFICATION OF HARDWARE AND SOFTWARE, AND COMPUTER PRODUCT

CROSS-REFERENCE TO RELATED APPLICATIONS

This application is based upon and claims the benefit of priority from the prior Japanese Patent Application No. 2005-072099, filed on Mar. 14, 2005, the entire contents of which are incorporated herein by reference.

BACKGROUND OF THE INVENTION

1. Field of the Invention

The present invention relates to a method and an apparatus for supporting a verification of functions of hardware and software by setting an appropriate priority to a verification of each function, and a computer product.

2. Description of the Related Art

In development of hardware and software, scale of subjects of the development has been becoming large as a design technology progresses. Accordingly, verification work, which is for verifying a subject of development, forms an increasing proportion in entire work in the development. In a conventional method of creating verification items for verifying complex and diverse functions of the subject, verification items are not created from specifications of the subject, and priority is assigned to the verification items using a cause-and-effect graph (see, for example, Japanese Patent Application Laid-Open No. 2002-297412).

In the above conventional technology, such verification items are arbitrarily created by verifiers or created based on implementation of the subject of which design has been completed. Consequently, completeness of the verification items in covering the functions of the subject vary depending on experience and capability of the verifiers, and it is difficult to evaluate whether the verification items accurately cover functions described in the specifications of the subject.

In addition, in the conventional technology described above, if a problem, such as a serious bug, is detected in the subject during a verification process, especially just before finishing the verification process, work that has been achieved in the verification process until the problem is detected becomes useless. Moreover, in the conventional technology, it is impossible to determine to which of the verification items priority should be given. Therefore, when an amount of the verification item becomes so massive that verification cannot be performed on all of the verification items, verification performed on some of the verification items can be useless.

SUMMARY OF THE INVENTION

It is an object of the present invention to solve at least the above problems in the conventional technology.

An apparatus according to an aspect of the present invention, which is an apparatus for supporting a verification for each of a plurality of functions of a target object, includes: a receiving unit that receives a use case diagram that includes a plurality of use cases each of which corresponding to each of the functions; an extracting unit that extracts a relation between the use cases from the use case diagram; and a setting unit that sets a priority of verification for each of the use cases based on the relation.

A method according to another aspect of the present invention, which is a method of supporting a verification for each of a plurality of functions of a target object, includes: receiving a use case diagram that includes a plurality of use cases each of which corresponding to each of the functions; extracting a relation between the use cases from the use case diagram; and setting a priority of verification for each of the use cases based on the relation.

A computer-readable recording medium according to still another aspect of the present invention stores a computer program that causes a computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a table of a verification item list according to the third embodiment;

FIG. 9 is a schematic of a use case diagram according to a fourth embodiment of the present invention;

DETAILED DESCRIPTION OF THE PREFERRED EMBODIMENTS

Exemplary embodiments according to the present invention will be explained in detail with reference to the accompanying drawings.

Figure 1:
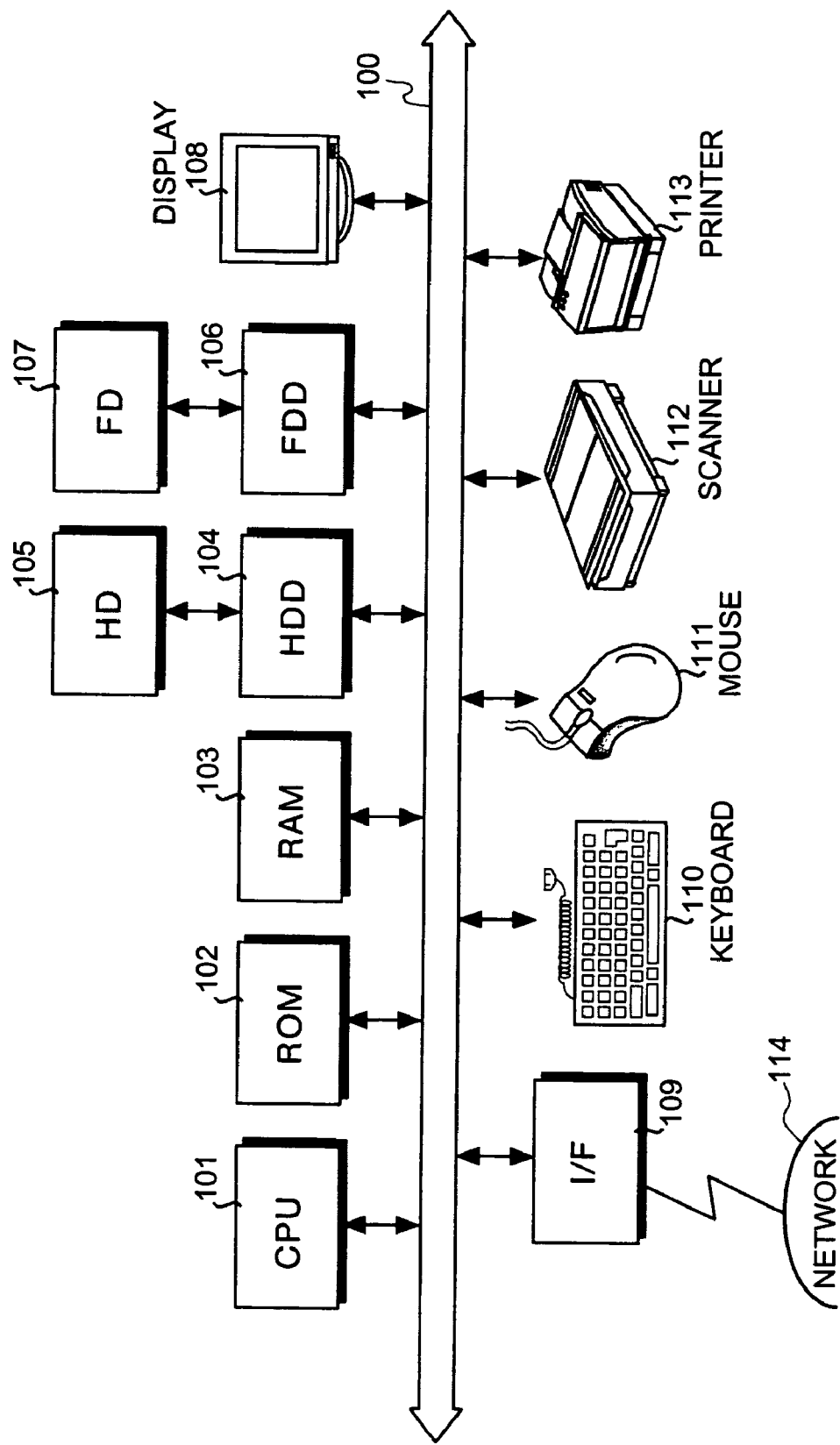
FIG. 1 is a schematic of a hardware configuration of an apparatus for supporting verification according to the present invention.

FIG. 1 is a schematic of a hardware configuration of an apparatus for supporting verification according to the present invention. As shown in FIG. 1, the apparatus includes a central processing unit (CPU) 101, a read-only memory (ROM) 102, a random-access memory (RAM) 103, a hard disk drive (HDD) 104, a hard disk (HD) 105, a flexible disk drive (FDD) 106, a flexible disk (FD) 107 as a removable recording medium, a display 108, an interface (I/F) 109, a keyboard 110, a mouse 111, a scanner 112, and a printer 113. Each of components is connected through a bus 100.

The CPU 101 controls a whole of the apparatus. The ROM 102 stores a computer program such as a boot program. The RAM 103 is used as a work area of the CPU 101. The HDD 104 controls read/write of data from/to the HD 105 in accordance with the control of the CPU 101. The HD 105 stores data that is written in accordance with the control of the HDD 104.

The FDD 106 controls read/write of data from/to the FD 107 in accordance with the control of the CPU 101. The FD 107 stores data that is written by a control of the FDD 106 and lets the apparatus read the data stored in the FD 107.

Apart from the FD 107, a compact disc-read only memory (CD-ROM), a compact disc-readable (CD-R), a compact disc-rewritable (CD-RW), a magnetic optical disc (MO), a digital versatile disc (DVD), and a memory card may also be used as the removable recording medium. The display 108 displays a curser, an icon, a tool box as well as data such as documents, images, and functional information. A cathode ray tube (CRT), a thin-film-transistor (TFT) liquid-crystal display, or a plasma display can be used as the display 108.

The I/F 109 is connected to a network 114 such as the Internet through a communication line and is connected to other devices through the network 114. The I/F 109 controls the network 114 and an internal interface to control input/output of data to/from external devices. A modem or a local area network (LAN) adapter can be used as the I/F 109.

The keyboard 110 includes keys for inputting characters, numerals, and various instructions, and is used to input data. A touch-panel input pad or a numerical key pad may also be used as the keyboard 110. The mouse 111 is used to shift the curser, select a range, shift windows, and change sizes of the windows on a display. A track ball or a joy stick may be used as a pointing device if functions similar to those of the mouse 111 are provided.

The scanner 112 optically captures an image and inputs image data to the apparatus. The scanner 112 may be provided with an optical character read (OCR) function. The printer 113 prints the image data and document data. For example, a laser printer or an inkjet printer may be used as the printer 113.

Figure 2:
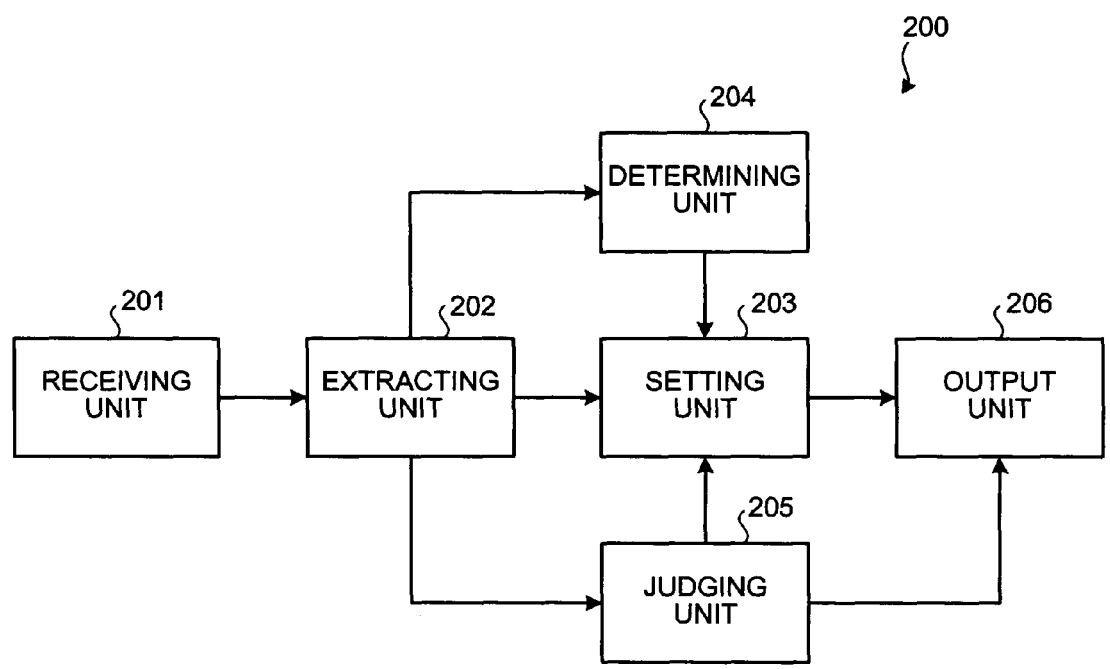
FIG. 2 is a block diagram of a functional configuration of the apparatus shown in FIG. 1.

FIG. 2 is a block diagram of a functional configuration of the apparatus shown in FIG. 1. As shown in FIG. 2, an apparatus for supporting verification 200 includes a receiving unit 201, an extracting unit 202, a setting unit 203, a determining unit 204, a judging unit 205, and an output unit 206.

The receiving unit 201 receives a use case diagram that indicates functions of a subject of verification. The subject of verification is, for example, hardware such as a large-scale integration (LSI) or various kinds of software that is being developed. The use case diagram is computer-readable electronic data described in a unified modeling language (UML), which is an object-oriented language. The use case diagram may be input to the receiving unit 201 by operating the keyboard 110 and the mouse 111 shown in FIG. 1, or by receiving the use case diagram through the network 114 from an external device.

The extracting unit 202 extracts, from the use case diagram, arbitrary relation information that indicates relation between use cases described in the use case diagram. The relation information is described between two use cases, and indicates a type (inclusion relation, extension relation, or generalization relation) of relation between the two.

The inclusion relation indicates a relation in which a function of one of the use cases includes a function of the other of the use cases. In other words, the one is a use case (higher-level use case) of a higher-level concept and the other is a use case (lower-level use case) of a lower-level concept. For example, if a verification item for the function of the one is "draw a rectangle" and a verification item for the function of the other is "draw a straight line", since a rectangle is formed by combining straight lines, the inclusion relation exists between the use cases. The inclusion relation is expressed by a dotted arrow that points toward the lower-level use case and a stereotype <<include>>.

The extension relation is a relation in which a function of one of the use cases is extended by a function of the other of the use cases. For example, when a verification item for the function of the one is "draw a dot" and a verification item for the function of the other is "set a drawing color", since a drawing color is set for a dot under a predetermined condition, the extension relation exists between the use cases. If the predetermined condition is not satisfied, the drawing color cannot be set. The extension relation is expressed by a dotted arrow that points toward the higher-level use case and a stereotype <<extend>>.

The generalization relation is a relation in which a function of one of the use cases is generalized (abstracted) by a function of the other of the use cases. For example, a verification item for the function of the one is "draw a polygon" and a verification item for the function of the other is "draw a triangle", since a polygon is a generalized figure of a triangle, the generalization relation exists between the use cases. The generalization relation is expressed by a solid line that points toward the higher-level use case.

The setting unit 203 sets priority of the verification item for the use case based on the relation information extracted. Specifically, the setting unit 203 defines the higher-level use case and the lower-level use case for a pair of the use cases having the relation information therebetween.

The priority of the verification items for the higher-level use case and the lower-level use case is set by assigning a value corresponding to the relation information. Specifically, by adding the value to priority of the higher-level use case, priority of the lower-level use case can be set. Moreover, by subtracting the value from the priority of the lower-level use case, the priority of the higher-level use case can be set. Higher priority is assigned to the lower-level use case because the lower-level use case having a lower-level concept has more complicated function.

The determining unit 204 determines, based on the relation information extracted, a use case that is superordinate to any one of use cases associated by the relation information as a use case having a highest-level concept (highest-level use case). The setting unit 203 sets, based on priority of a verification item for the highest-level use case, priority of verification items for use cases other than the highest-level use case. In other words, the priority of the highest-level use case is set as a reference for use cases other than the highest-level use case.

The determining unit 204 may determine a use case that is not associated by any of the relation information extracted as the highest-level use case. In this case, the setting unit 203 sets a predetermined value to priority of a verification item for the highest-level use case. Because for such highest-level use case having no relation information, functions are not specified, the priority should be set low. Specifically, it is desirable that the predetermined value is set equivalent to a value of priority of other highest-level use cases.

The judging unit 205 judges whether a set of description including relation information and use cases that are associated by the relation information includes a directed cycle. The directed cycle is a loop formed in a predetermined direction. For example, the directed cycle is a loop formed in the set when use cases are traced starting from the highest-level use case to the lower-level use case in a descending order of a level of concept and when a lower-level use case having the lowest-level concept among lower-level use cases in the set is superordinate to the highest-level use case in the set. In such case, since it is impossible to assign priority to the use cases, priority of verification items for all of the use cases in the set is set equally.

The output unit 206 outputs a verification item list in which a verification item for a use case and priority of the verification item are associated. With the verification item list, verifiers can grasp verification on which verification item should take precedence at an early stage of the verification process. Thus, only necessary verification items on which verification is to be performed can be selected from among verification items, thereby reducing the verification work. In addition, when the directed cycle is detected, it may be determined that there is an error in design, and a description error information may be output from the output unit 206. Thus, a problem such as a bug can be detected at an early stage of the verification process before setting the priority.

Specifically, functions of the receiving unit 201, the extracting unit 202, the setting unit 203, the determining unit 204, the judging unit 205, and the output unit 206 are realized by the CPU 101 executing a computer program that is recorded on a recording medium, such as the ROM 102, the RAM 103, the HD 105, and the FD 107 shown in FIG. 1.

A sign described along with the stereotype in the relation information in the use case diagram is a value for setting priority of verification items for use cases associated with each other by the relation information. An arithmetic expression described along with the stereotype is an expression for setting the priority.

Figure 3:
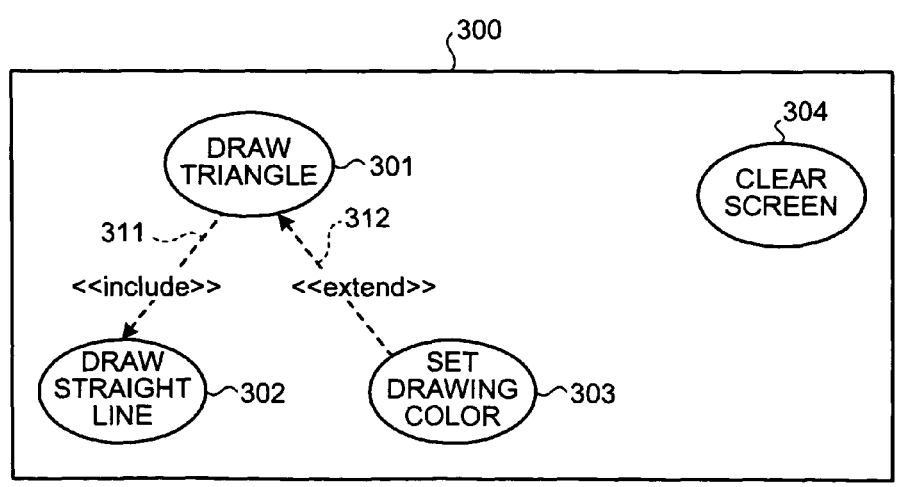
FIG. 3 is a schematic of a use case diagram according to a first embodiment of the present invention.
Figures 4, 5:
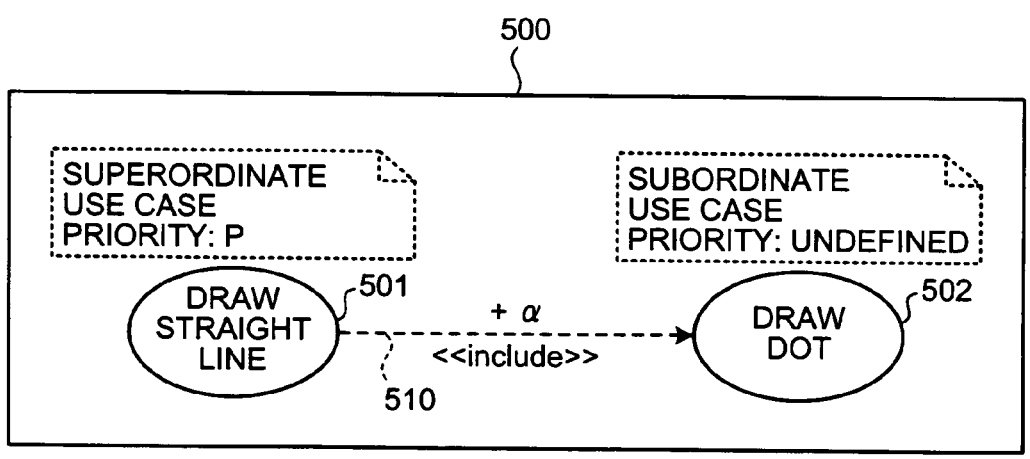
FIG. 4 is a table of a verification item list according to the first embodiment.
FIG. 5 is a schematic of a use case diagram according to a second embodiment of the present invention.

FIG. 3 is a schematic of a use case diagram according to a first embodiment of the present invention. FIG. 4 is a table of a verification item list according to the first embodiment. A use case diagram 300 that includes use cases 301 to 304 and relation information 311 and 312 is shown in FIG. 3. A verification item list 400 for the use case diagram 300 is shown in FIG. 4.

As shown in FIG. 3 and FIG. 4, priority of a verification item for the use case 301 is set as P1, priority of a verification item for the use case 302 is set as P2, priority of a verification item for the use case 303 is set as P3, and priority of a verification item for the use case 304 is set as P4. Thus, using the use case diagram 300, priority can be assigned easily and accurately to verification items that accurately cover functions described in specifications of a subject of development.

Figures 6, 7:
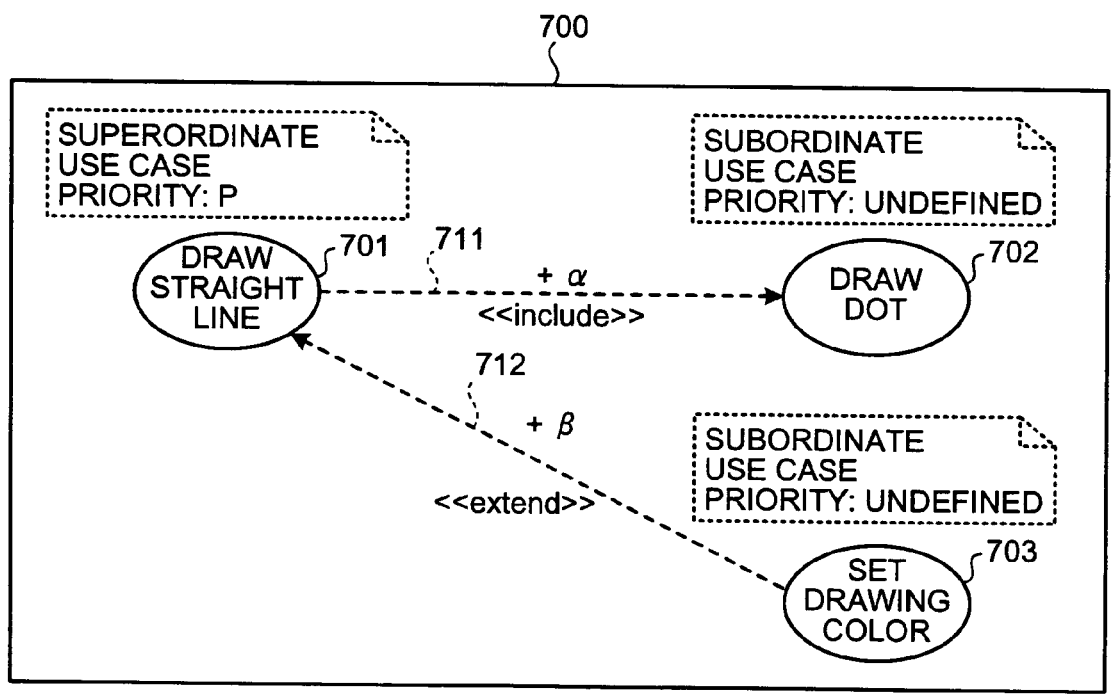
FIG. 6 is a table of a verification item list according to the second embodiment.
FIG. 7 is a schematic of a use case diagram according to a third embodiment of the present invention.

FIG. 5 is a schematic of a use case diagram according to a second embodiment of the present invention. FIG. 6 is a table of a verification item list according to the second embodiment. A use case diagram 500 that includes a higher-level use case 501, a lower-level use case 502, and relation information 510 that associates the higher-level use case 501 and the lower-level use case 502 is shown in FIG. 5. A verification item list 600 for the use case diagram 500 is shown in FIG. 6.

As shown in FIG. 5, priority of a verification item for the higher-level use case 501 is set as P. A value of the relation information 510 that indicates the inclusion relation is set as $+\alpha$. Therefore, priority of a verification item for the lower-level use case 502 is $P+\alpha$. Thus, the priority of the verification item for the lower-level use case 502 can be relatively set based on the priority of the verification item for the higher-level use case 501 and the relation information 510.

FIG. 7 is a schematic of a use case diagram according to a third embodiment of the present invention. FIG. 8 is a table of a verification item list according to the third embodiment. A use case diagram 700 that includes a higher-level use case 701, a lower-level use case 702, a lower-level use case 703, relation information 711 that associates the higher-level use case 701 and the lower-level use case 702, and relation information 712 that associates the higher-level use case 701 and the lower-level use case 703 is shown in FIG. 7. A verification item list 800 for the use case diagram 700 is shown in FIG. 8.

As shown in FIG. 7, priority of a verification item for the higher-level use case 701 is set as P. A value of the relation information 711 that indicates the inclusion relation is set as $+\alpha$. Therefore, priority of a verification item for the lower-level use case 702 is $P+\alpha$. A value of the relation information 712 that indicates the extension relation is set as $+\beta$. Therefore, priority of a verification item for the lower-level use case 703 is $P+\beta$. The values $\alpha$ and $\beta$ are different values. Because connection between the verification items having the inclusion relation is stronger, such values may be set as, for example, $\alpha>\beta$. Thus, the priority of the verification items can be set depending on a type of the relation information.

Figures 10, 11:
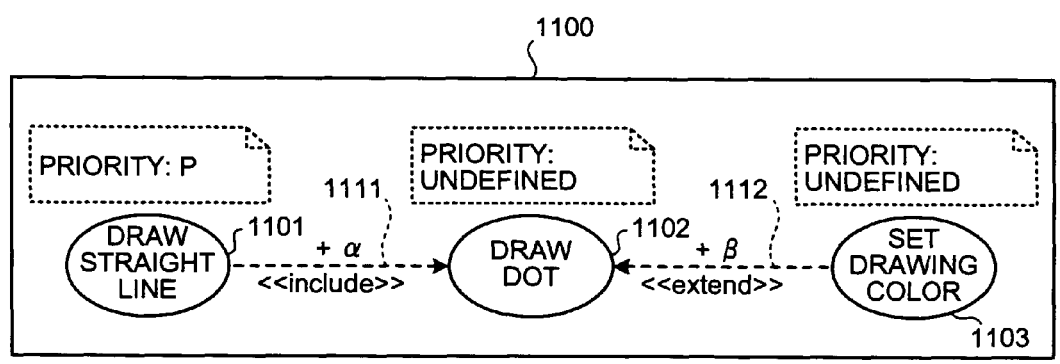
FIG. 10 is a table of a verification item list according to the fourth embodiment.
FIG. 11 is a schematic of a use case diagram according to a fifth embodiment of the present invention.

FIG. 9 is a schematic of a use case diagram according to a fourth embodiment of the present invention. FIG. 10 is a table of a verification item list according to the fourth embodiment. A use case diagram 900 that includes a higher-level use case 901, a lower-level use case 902, a lower-level use case 903, relation information 911 that associates the higher-level use case 901 and the lower-level use case 902, and relation information 912 that associates the higher-level use case 901 and the lower-level use case 903 is shown in FIG. 9. A verification item list 1000 for the use case diagram 900 is shown in FIG. 10.

As shown in FIG. 9, priority of a verification item for the higher-level use case 901 is set as P. The relation information 911 that indicates the inclusion relation is defined by an arithmetic expression 921 (higher-level>lower-level). Therefore, priority of a verification item for the lower-level use case 902 is set as P−3 that satisfies the arithmetic expression 921. The relation information 912 that indicates the extension relation is defined by an arithmetic expression 922 (higher-level≦lower-level). Therefore, priority of a verification item for the lower-level use case 903 is set as P+1 that satisfies the arithmetic expression 922.

Figures 12, 13:
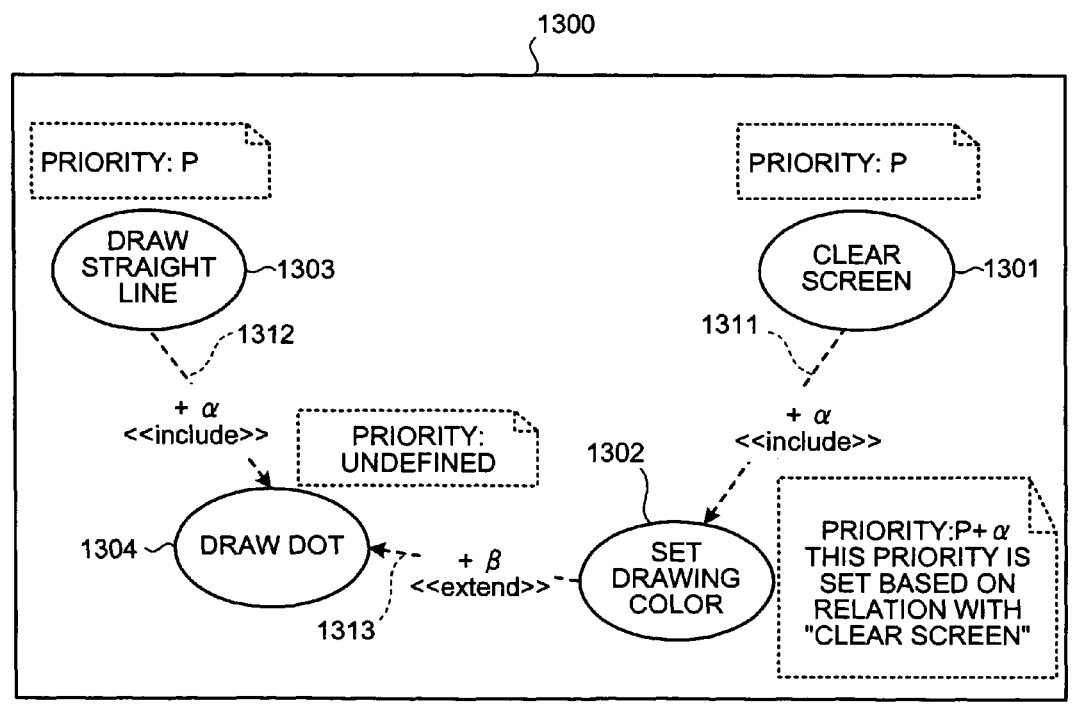
FIG. 12 is a table of a verification item list according to the fifth embodiment.
FIG. 13 is a schematic of a use case diagram according to a sixth embodiment of the present invention.

FIG. 11 is a schematic of a use case diagram according to a fifth embodiment of the present invention. FIG. 12 is a table of a verification item list according to the fifth embodiment. A use case diagram 1100 that includes a use case 1101, a use case 1102, a use case 1103, relation information 1111 that associates the use case 1101 and the use case 1102, and relation information 1112 that associates the use case 1101 and the use case 1103 is shown in FIG. 11. A verification item list 1200 for the use case diagram 1100 is shown in FIG. 12.

Between the use cases 1101 and the use case 1102, based on the relation information 1111 that indicates the inclusion relation, the use case 1101 is defined as the higher-level use case and the use case 1102 is defined as the lower-level use case. On the other hand, between the use case 1102 and the use case 1103, based on the relation information 1112 that indicates the extension relation, the use case 1102 is defined as the higher-level use case and the use case 1103 is defined as the lower-level use case.

Since priority of a verification item for the use case 1101 is set as P, priority of a verification item for the use case 1102, which is subordinate to the use case 1101, is set as P+α. Since the priority of the verification item for the use case 1102 has been set as P+α, priority of a verification item for the use case 1103, which is subordinate to the use case 1102, is set as P+α+β. Thus, based on priority that has already been set, priority that has not yet been set can be set.

Figures 14, 15:
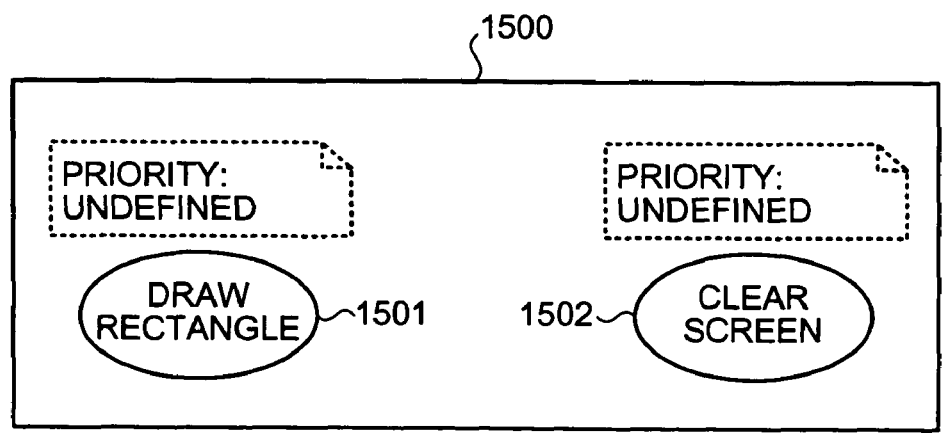
FIG. 14 is a table of a verification item list according to the sixth embodiment.
FIG. 15 is a schematic of a use case diagram according to a seventh embodiment of the present invention.

FIG. 13 is a schematic of a use case diagram according to a sixth embodiment of the present invention. FIG. 14 is a table of a verification item list according to the sixth embodiment. A use case diagram 1300 that includes use cases 1301 to 1304, and relation information 1311 to 1313 is shown in FIG. 13. A verification item list 1400 for the use case diagram 1300 is shown in FIG. 14.

Between the use cases 1301 and 1302, based on the relation information 1311 that indicates the inclusion relation, the use case 1301 is defined as the higher-level use case and the use case 1302 is defined as the lower-level use case. Since priority of a verification item for the use case 1301 is set as P, priority of a verification item for the use case 1302, which is subordinate to the use case 1301, is set as P+α.

On the other hand, between the use case 1303 and the use case 1304, based on relation information 1312 that indicates the inclusion relation, the use case 1303 is defined as the higher-level use case and the use case 1304 is defined as the lower-level use case. Since priority of a verification item for the use case 1303 is set as P, priority of a verification item for the use case 1304, which is subordinate to the use case 1303, is set as P+α.

Moreover, between the use cases 1304 and the use case 1302, based on the relation information 1313 that indicates the extension relation, the use case 1304 is defined as the higher-level use case, and the use case 1302 is defined as the lower-level use case. In this relation, priority of the verification the use case 1302, which is subordinate to the use case 1304, is set as P+α+β.

For the use case 1302, two different values P+α set based on the relation information 1311 and P+α+β set based on the relation information 1313 are set as the priority. In such a case, a larger value, which is the value P+α+β in this case, may be selected as the priority. Thus, even if priority has been set to a value, the value can be compared with another value that is to be obtained later based on different relation information to determine the priority, thereby improving accuracy of the priority.

Figures 16, 17:
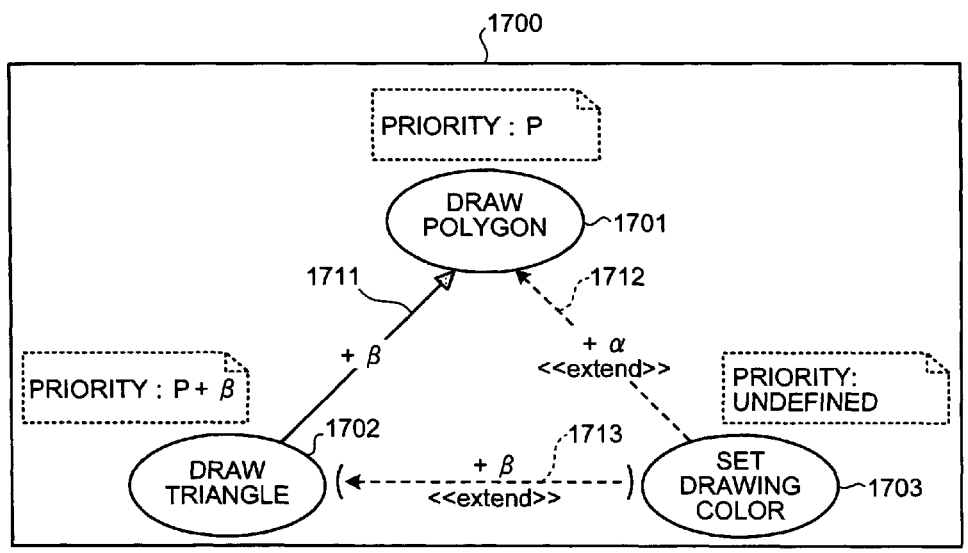
FIG. 16 is a table of a verification item list according to the seventh embodiment.
FIG. 17 is a schematic of a use case diagram according to an eighth embodiment of the present invention.

FIG. 15 is a schematic of a use case diagram according to a seventh embodiment of the present invention. FIG. 16 is a table of a verification item list according to the seventh embodiment. A use case diagram 1500 that includes a use cases 1501 and 1502 is shown in FIG. 15. A verification item list 1600 for the use case diagram 1500 is shown in FIG. 16.

As shown in FIG. 15, there is no relation information between the use cases 1501 and 1502. The use cases 1501 and 1502 exist independently from each other. Because it is impossible to determine subordinative relation between such use cases 1501 and 1502, priority of verification items for both use cases 1501 and 1502 is set to an identical value P. In such a case, a different value is not to be set after the priority has been set, as a case explained in the sixth embodiment. Therefore, if there is another use case or relation information in the use case diagram 1500, the verification items for the use cases 1501 and 1502 are to have the lowest priority among use cases in the use case diagram 1500.

Figures 18, 19:
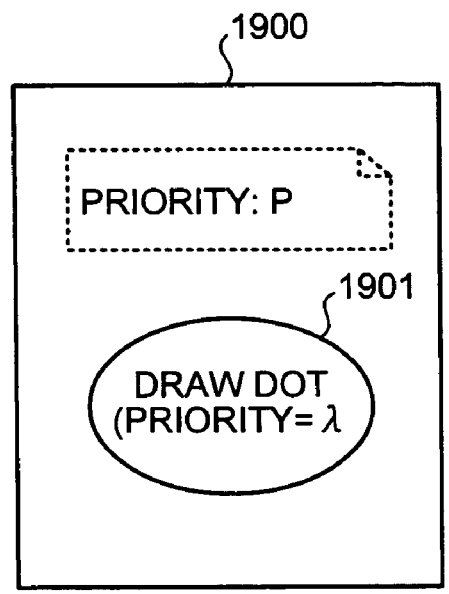
FIG. 18 is a table of a verification item list according to the eighth embodiment.
FIG. 19 is a schematic of a use case diagram according to a ninth embodiment of the present invention.

FIG. 17 is a schematic of a use case diagram according to an eighth embodiment of the present invention. FIG. 18 is a table of a verification item list according to the eighth embodiment. A use case diagram 1700 that includes use cases 1701 to 1703, and relation information 1711 and 1712 is shown in FIG. 17. A verification item list 1800 for the use case diagram 1700 is shown in FIG. 18.

Between the use cases 1701 and 1702, base on the relation information 1711 that indicates the generalization relation, the use case 1701 is defined as the higher-level use case, and the use case 1702 is defined as the lower-level use case. Since priority of a verification item for the use case 1701 is set as P, priority of a verification item for the use case 1702, which is subordinate to the use case 1701, is set as P+β.

On the other hand, between the use cases 1701 and 1703, the use case 1701 is defined as the higher-level use case, and the use case 1703 is defined as the lower-level use case. Since priority of the verification item for the use case 1701 is set as P, priority of a verification item for the use case 1703, which is subordinate to the use case 1701, is set as P+α.

In the use case diagram 1700, there is the generalization relation between the use cases 1701 and 1702. Therefore, if there is the extension relation between the use cases 1701 and 1703, there is the extension relation also between the use cases 1702 and 1703, even though there is no description indicating such relation. In other words, there practically is tacit relation information 1713 that indicates the extension relation between the use cases 1702 and 1703. A value of the relation information 1713 depends on a value of the relation information 1712, therefore, the value is +α.

Between the use cases 1702 and 1703, the use case 1702 is defined as the higher-level use case, and the use case 1703 is defined as the lower-level use case. Since the priority of the verification item for the use case 1702 is set as P+β, the priority of the verification item for the use case 1703, which is subordinate to the use case 1702, is changed from P+α to P+α+β. Thus, by detecting tacit relation information, which is not actually described, priority can be set accurately.

While in the above example, the relation information 1712 indicates the extension relation, relation indicated by the relation information 1712 may be the inclusion relation with which the use case 1701 is defined as the higher-level use case and the use case 1703 is defined as the lower-level use case. In that case, the tacit relation information 1713 also indicates the inclusion relation defining that the use case 1702 is the higher-level use case and the use case 1703 is the lower-level use case.

Figures 20, 21:
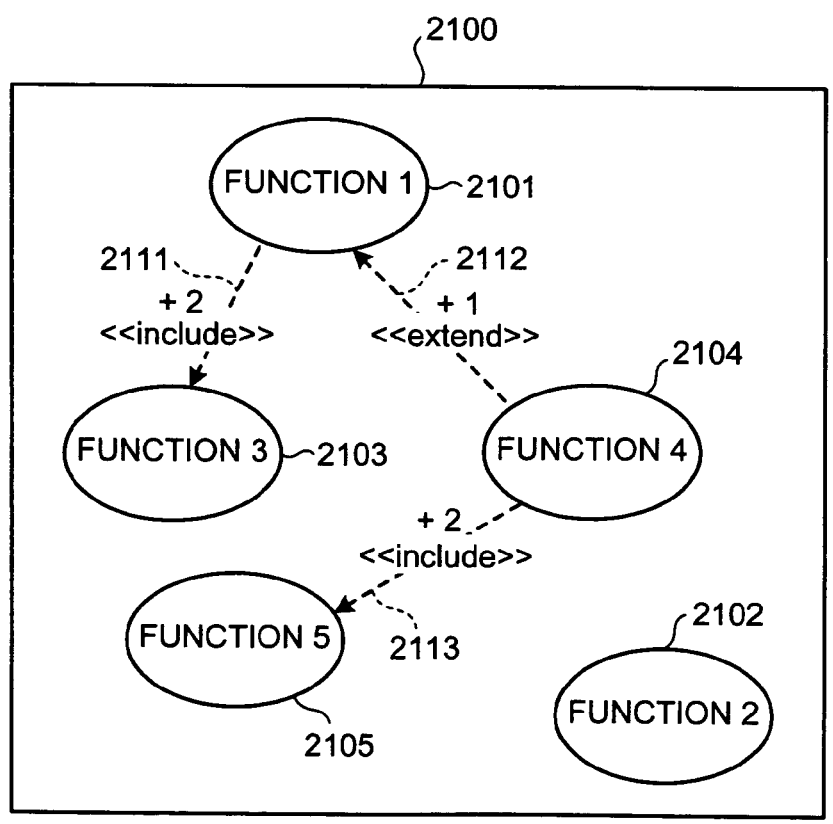
FIG. 20 is a table of a verification item list according to the ninth embodiment.
FIG. 21 is a schematic of a use case diagram according to a tenth embodiment of the present invention.

FIG. 19 is a schematic of a use case diagram according to a ninth embodiment of the present invention. FIG. 20 is a table of a verification item list according to the ninth embodiment. A use case diagram 1900 that includes a use case 1901 is shown in FIG. 19. A verification item list 2000 for the use case diagram 1900 is shown in FIG. 20.

The use case 1901 has a particular value λ as priority of a verification item. The value λ is specified by a user. Even if the priority is set to P later as cases explained in the first to eighth embodiments, the use case 1901 maintains the value λ. Thus, it is possible to obtain improved flexibility in setting priority.

Figures 22, 23:
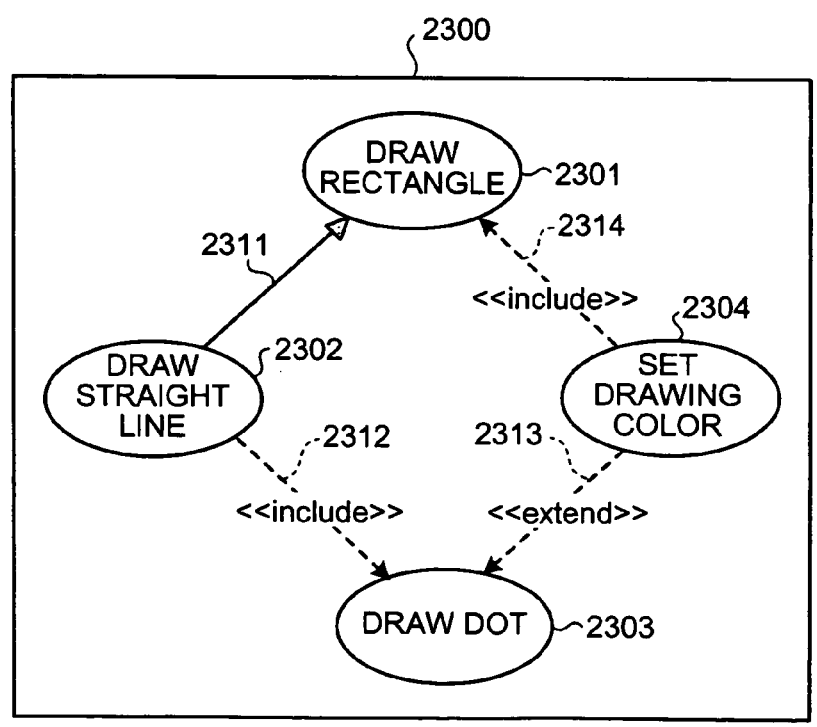
FIG. 22 is a table of a verification item list according to the tenth embodiment.
FIG. 23 is a schematic of a use case diagram according to an eleventh embodiment of the present invention.

FIG. 21 is a schematic of a use case diagram according to a tenth embodiment of the present invention. FIG. 22 is a table of a verification item list according to the tenth embodiment. A use case diagram 2100 that includes use cases 2101 to 2105 and relation information 2111 to 2113 is shown in FIG. 21. A verification item list 2200 for the use case diagram 2100 is shown in FIG. 22.

First, the highest-level use case is determined. Specifically, the relation information 2111 to 2113 is extracted, and based on the relation information 2111 to 2113, the highest-level use case is determined from among the use cases 2101 to 2105 that are associated by the relation information 2111 to 2113. It is required to satisfy one of conditions 1 and 2 below to be the highest-level use case.

1. a use case that does not have a concept that is subordinate to a concept of any use case, and that has a concept that is superordinate to a concept of at least one of use cases
2. a use case that is not associated by any relation information For example, the use case 2101 is defined as the higher-level use case that is superordinate to the use case 2103 by the relation information 2111. The use case 2101 is also defined as the higher-level use case that is superordinate to the use case 2104 by the relation information 2112. Therefore, the use case 2101 satisfies the condition 1 and is determined as the highest-level use case. Furthermore, the use case 2102 satisfies the condition 2 and is determined as the highest-level use case. The rest, which correspond to the use cases 2103 to 2105, do not satisfy either of the conditions 1 or 2, therefore, cannot be the highest-level use case.

Then, priority of verification items for the use cases 2101 and 2102, which are the highest-level use cases, is set as P. The relation information 2111 is extracted to determine priority of a verification item for the use case 2103. Based on a value P of the priority of the use case 2101 and a value +2 of the relation information 2111, the priority of the use case 2103 is set as P+2.

Moreover, the relation information 2112 is extracted to determine priority of a verification item for the use case 2104. Based on the value P of the priority of the use case 2101 and a value +1 of the relation information 2112, the priority of the use case 2104 is set as P+1.

Furthermore, the relation information 2113 is extracted to determine priority of a verification item for the use case 2105. Based on the value P+1 of the priority of the use case 2104 and a value +2 of the relation information 2113, the priority of the use case 2105 is set as P+3. Thus, it is possible to determined that the verification item for the use case 2105 having the highest priority is the most important.

Figure 24:
FIG. 24 is a table of a verification item list according to the eleventh embodiment.

FIG. 23 is a schematic of a use case diagram according to an eleventh embodiment of the present invention. FIG. 24 is a table of a verification item list according to the eleventh embodiment. A use case diagram 2300 that includes use cases 2301 to 2304 is shown in FIG. 23. A verification item list 2400 for the use case diagram 2300 is shown in FIG. 24.

In a judging process for the directed cycle, a set of description that includes use cases and relation information forming a loop is detected from the use case diagram. In this detection, even if a loop is not formed with the use cases and the relation information, if the tacit relation information with which a loop is formed exists in the description, as the example described in the eighth embodiment, such description is also detected. Then, it is determined whether a use case that satisfies the condition 1 for the highest-level use case explained in the tenth embodiment is included in the description detected.

When it is determined that the description includes such use case satisfying the condition 1, that means that the description does not include the directed cycle. On the other hand, when it is determined that the description does not to include such use case satisfying the condition 1, that means that a use case (highest-level use case) having the highest-level concept is defined to be subordinate to a use case (lowest-level use case) having the lowest-level concept by the relation information that associates the highest-level use case and the lowest-level use case in the description.

In the use case diagram 2300 (set of description), the use cases 2301 to 2304 and relation information 2311 to 2313 form a loop. Since there is no highest-level use case that satisfies the condition 1 among the use cases 2301 to 2304, it is determined that the use case diagram 2300 forms the directed cycle.

Priority of verification items for the use cases 2301 to 2304 forming the directed cycle may be set to an identical value of P as shown in FIG. 24. In addition, the description error information indicating that the use case diagram 2300 includes a description error may be output from the output unit 206 shown in FIG. 2. Thus, such description error can be detected before the verification work is started, thereby preventing useless verification.

Figure 25:
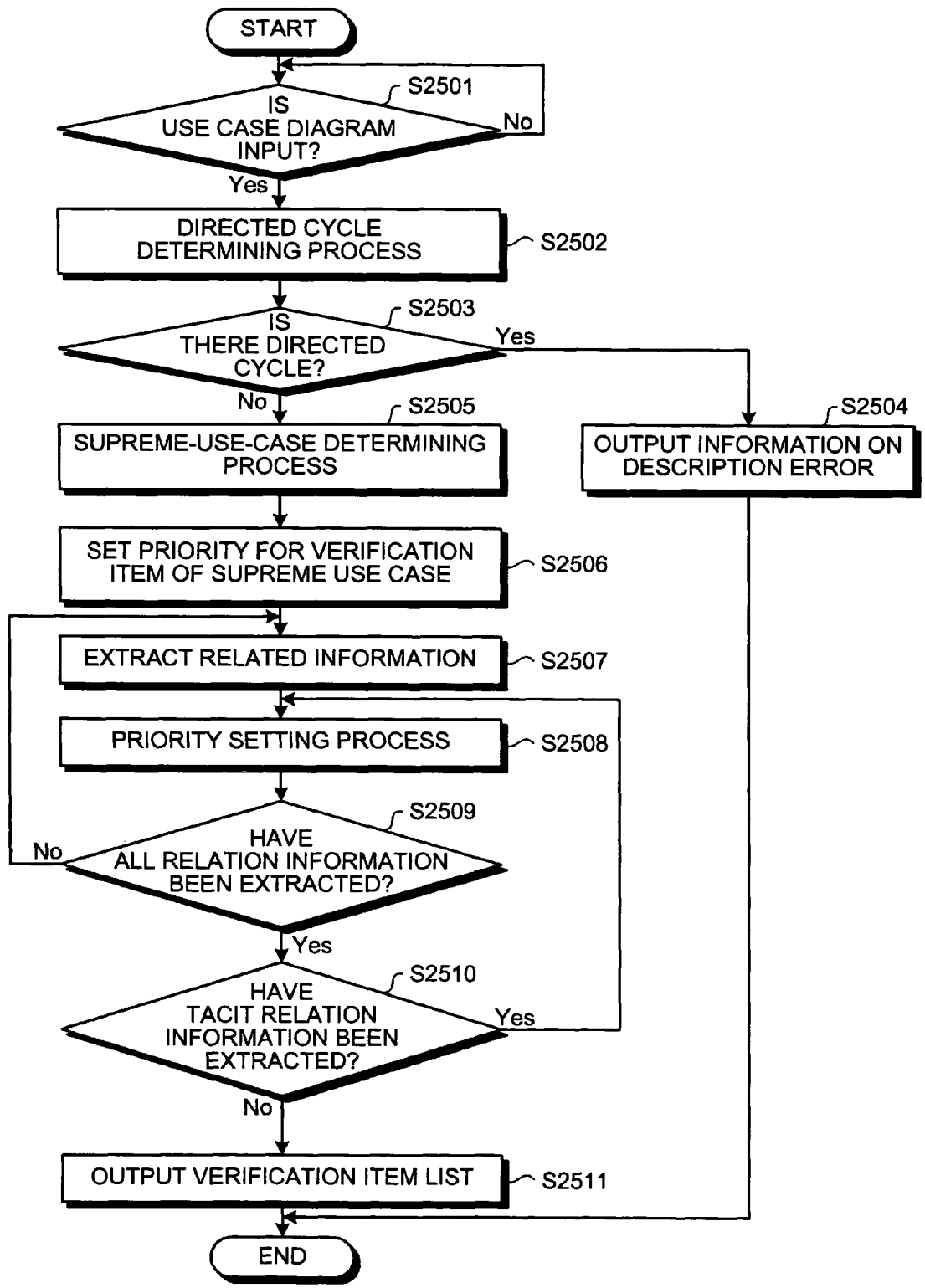
FIG. 25 is a flowchart of a verification supporting process according to the present invention.

FIG. 25 is a flowchart of a verification supporting process according to the present invention. AS shown in FIG. 25, when a use case diagram is input ("YES" at step S2501), a directed-cycle detecting process for detecting a directed cycle in a use case diagram is performed (step S2502) as described in the eleventh embodiment. When a directed cycle is detected in the use case diagram ("YES" at step S2503), the description error information is output (step S2504). Then, a series of processes is finished. On the other hand, when no directed cycle is detected in the use case diagram ("NO" at step S2503), a highest-level-use-case determining process for deterring the highest-level use case is performed (step S2505) as described in the tenth embodiment.

Then, priority of a verification item for the use case determined to be the highest-level use case is determined (step S2506). Relation information in the use case diagram is extracted (step S2507), and then, a priority setting process in the priority setting process is performed (step S2508). In the priority setting process, priority of use cases that are associated by the relation information extracted is set. If all relation information has not yet been extracted ("NO" at step S2509), the process returns to step S2507 to extract relation information that has not been extracted.

On the other hand, if all relation information has been extracted ("YES" at step S2509), it is determined whether tacit relation information as described in the eighth embodiment is detected (step S2510). When the tacit relation information is detected ("YES" at step S2510), the process returns to step S2508 to perform the priority setting process based on the tacit relation information. On the other hand, when the tacit relation information is not detected ("NO" at step S2510), a verification item list in which the priority is assigned to the verification items is output (step S2511). Then, a series of processes is finished.

While in the flowchart described above, when the directed cycle is detected at step S2503 ("YES" at step S2503), the description error information is output at step S2504, the verification items for use cases in the directed cycle may be set to have identical priority instead of outputting the description error information.

Moreover, while in the embodiments described above, priority of use cases are set such that priority of a verification item for the lower-level use case is set based on a value (or arithmetic expression) of the relation information and priority of a verification item for the higher-level use case, the priority may be set such that the priority of the verification item for the higher-level use case is set based on the value (or arithmetic expression) of the relation information and the priority of the verification item for the lower-level use case.

Suppose, in an example shown in FIG. 5, the priority of the verification item for the lower-level use case is set as P and the priority of the verification item for the higher-level use case has not been defined. The priority of the verification item for the higher-level use case is set as P–α.

As described, according to the present invention, using a use case diagram, verification items can accurately cover functions described in specifications of a subject of development. Moreover, priority is assigned to the verification items accurately covering the functions based on use cases and relation information in the use case diagram, thereby enabling recognition of important verification items having high possibility of causing a malfunction.

Thus, by performing verification on the verification items in a descending order of the priority, it is possible for a verifier to find a serious bug at an early stage. In addition, even when verification cannot be performed on all of the verification items because there is a massive amount of the verification items or because a verification period is limited, it is possible to efficiently limit the verification items by selecting verification items having higher priority. Thus, it is possible to reduce work in a verification process.

As described above, according to the method and apparatus for supporting verification, and the computer product, priority can be assigned to verification items that accurately cover functions described in specifications of a subject of development. Therefore, it is possible to find a problem in the subject at an early stage of the development, and to improve efficiency in verification work.

The method for supporting verification that is explained in the embodiments of the present invention is implemented by executing a computer program, which is prepared in advance, by a computer such as a personal computer and a workstation. The computer program is recorded in a computer-readable recording medium, such as the CD-ROM, the MO, and the DVD, and is executed by the computer reading out from the recording medium. The computer program may be a transmission medium that is distributed through a network such as the Internet.

According to the present invention, it is possible to find a problem in a subject of development at an early stage of the development.

Moreover, according to the present invention, it is possible to improve efficiency in verification work for the subject.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for supporting a verification for each of a plurality of functions of a target object, the apparatus comprising:
a receiving unit using a processor that receives a use case diagram that includes a plurality of use cases each of which corresponds to each of the functions;
an extracting unit that extracts a relation between the use cases from the use case diagram; and
a setting unit that sets a priority of verification for each of the use cases based on the relation, wherein
the use cases include a first use case, a second use case, and a third use case, the first use case having a first priority previously set by the setting unit,
the extracting unit extracts, from the use case diagram, a first relation between the first use case and the second use case and a second relation between the first use case and the third use case, and
the setting unit sets a second priority for the second use case based on the first relation and the first priority, and when a third relation between the second use case and the third use case that is tacit in the use case diagram is detected based on the first relation and the second relation, sets a third priority for the third use case based on the second relation and the second priority.

2. The apparatus according to claim 1, wherein the setting unit replaces a latest priority of the second use case set by the setting unit with the second priority.

3. The apparatus according to claim 1, further comprising a determining unit that determines a use case of dominance hierarchy from among the use cases based on the relation extracted, wherein
the setting unit sets the priority of each of the use cases other than the use case of dominance hierarchy based on a priority of the use case of dominance hierarchy.

4. The apparatus according to claim 1, further comprising an identifying unit that identifies a use case having no relation with any one of other use cases based on the relation extracted, wherein
the setting unit sets a predetermined priority for the use case identified.

5. The apparatus according to claim 1, further comprising a detecting unit that detects a directed cycle formed by a part of or all of the use cases, wherein
the setting unit sets, when the directed cycle is detected, same priority for use cases forming the directed cycle.

6. The apparatus according to claim 1, further comprising:
a detecting unit that detects a directed cycle formed by a part of or all of the use cases; and
an output unit that outputs, when the directed cycle is detected, information indicating an error in the use case diagram.

7. The apparatus according to claim 1, wherein an extension relation is detected as the third relation when the first relation is a generalization relation and the second relation is an extension relation.

8. The apparatus according to claim 1, wherein an inclusion relation is detected as the third relation when the first relation is a generalization relation and the second relation is an inclusion relation.

9. A method of supporting a verification for each of a plurality of functions of a target object, the method comprising:
receiving, using a proceesor a use case diagram that includes a plurality of use cases each of which corresponds to each of the functions;
extracting a relation between the use cases from the use case diagram; and
setting a priority of verification for each of the use cases based on the relation, wherein
the use cases include a first use case, a second use case, and a third use case, the first use case having a first priority previously set at the setting unit,
the extracting includes extracting, from the use case diagram, a first relation between the first use case and the second use case and a second relation between the first use case and the third use case, and the setting includes setting a second priority for the second use case based on the first relation and the first priority, and when a third relation between the second use case and the third use case that is tacit in the use case diagram is detected based on the first relation and the second relation, setting a third priority for the third use case based on the second relation and the second priority.

10. The method according to claim 9, wherein the setting includes replacing a latest priority of the second use case set at the setting with the second priority.

11. A computer-readable recording medium that stores a computer program for supporting a verification for each of a plurality of functions of a target object, wherein the computer program causes a computer to execute:

receiving a use case diagram that includes a plurality of use cases each of which corresponds to each of the functions;

extracting a relation between the use cases from the use case diagram; and setting a priority of verification for each of the use cases based on the relation, wherein the use cases include a first use case, a second use case, and a third use case, the first use case having a first priority previously set at the setting unit, the extracting includes extracting, from the use case diagram, a first relation between the first use case and the second use case and a second relation between the first use case and the third use case, and the setting includes setting a second priority for the second use case based on the first relation and the first priority, and when a third relation between the second use case and the third use case that is tacit in the use case diagram is detected based on the first relation and the second relation, setting a third priority for the third use case based on the second relation and the second priority.

12. The computer-readable recording medium according to claim 11, wherein the setting includes replacing a latest priority of the second use case set at the setting with the second priority.

\* \* \* \* \*

UNITED STATES PATENT AND TRADEMARK OFFICE
CERTIFICATE OF CORRECTION

PATENT NO. : 7,788,643 B2
APPLICATION NO. : 11/213942
DATED : August 31, 2010
INVENTOR(S) : Ryosuke Oishi et al.

Page 1 of 1

It is certified that error appears in the above-identified patent and that said Letters Patent is hereby corrected as shown below:

Column 12, line 54, in claim 9, delete "proceesor," and insert -- processor, -- therefor.

Signed and Sealed this
Fourth Day of January, 2011

David J. Kappos
*Director of the United States Patent and Trademark Office*